US012138820B2

(12) United States Patent
Durney

(10) Patent No.: US 12,138,820 B2
(45) Date of Patent: Nov. 12, 2024

(54) METHOD AND DEVICE FOR CUTTING STAGGERED POCKETS

(71) Applicant: Max W. Durney, Petaluma, CA (US)

(72) Inventor: Max W. Durney, Petaluma, CA (US)

( * ) Notice: Subject to any disclaimer, the term of this patent is extended or adjusted under 35 U.S.C. 154(b) by 0 days.

(21) Appl. No.: 18/126,463

(22) Filed: Mar. 26, 2023

(65) Prior Publication Data

US 2023/0311360 A1 Oct. 5, 2023

Related U.S. Application Data

(60) Provisional application No. 63/327,495, filed on Apr. 5, 2022.

(51) Int. Cl.

| | |
|---|---|
| ***B27C 5/04*** | (2006.01) |
| ***B27C 5/06*** | (2006.01) |
| ***B27F 5/10*** | (2006.01) |
| ***B27F 5/12*** | (2006.01) |

(52) U.S. Cl.

CPC .................. *B27C 5/04* (2013.01); *B27C 5/06* (2013.01); *B27F 5/10* (2013.01); *B27F 5/12* (2013.01); *Y10T 408/352* (2015.01)

(58) Field of Classification Search

CPC .. B27M 1/08; B27M 3/18; B27M 5/10; B27F 5/10; B27C 5/02; B27C 5/04; B27C 5/06

USPC ................. 29/33 R; 144/134.1, 144.52, 365; 408/26

See application file for complete search history.

(56) References Cited

U.S. PATENT DOCUMENTS 2,895,515 A * 7/1959 Ende ........................ B27B 25/10 33/430
3,841,368 A * 10/1974 Ritter ...................... B27C 5/003 144/136.6
4,002,329 A * 1/1977 Petrowski ............... B27B 25/10 269/318
4,603,719 A 8/1986 Durney
4,944,627 A 7/1990 Durney
5,063,982 A 11/1991 Durney
5,138,759 A * 8/1992 Gruetzmacher ..... B23Q 9/0042 403/402
5,375,636 A * 12/1994 Bosten ................... B27G 21/00 144/368
5,493,789 A * 2/1996 Duginske ............... B23Q 3/007 33/640
5,553,645 A 9/1996 Durney
5,758,557 A * 6/1998 Moreton ................ B23Q 3/005 83/467.1
6,305,449 B1 * 10/2001 Stover ....................... B27F 1/12 144/135.2

(Continued)

*Primary Examiner* — Sunil K Singh
*Assistant Examiner* — Michael Vitale
(74) *Attorney, Agent, or Firm* — Santa Fe IP, LLC

(57) ABSTRACT

A pocket-cutting device routs staggered pockets in elongated joinery member. The pocket-cutting device includes a base having a worktop, a clamp assembly for clamping the joinery member to the worktop, a router assembly for routing the pockets in the joinery member, a drill assembly for drilling bores in the joinery member, and a guide mounted in the worktop dimensioned and configured to position the joinery member in first and second positions relative to the router assembly for routing first and second pockets and first and second bores in the joinery member at staggered positions. A method of using the staggered pockets is also disclosed.

9 Claims, 6 Drawing Sheets

(56) References Cited

U.S. PATENT DOCUMENTS

| | | | | |
|---|---|---|---|---|
| 6,390,159 | B1 * | 5/2002 | Pinske | B27F 5/12 144/368 |
| 6,877,536 | B2 | 4/2005 | Durney | |
| 9,403,285 | B2 | 8/2016 | Durney | |
| 10,220,540 | B1 | 3/2019 | Durney | |
| 11,045,970 | B1 | 6/2021 | Durney | |
| 2005/0115375 | A1 * | 6/2005 | Dick | B27M 1/08 29/563 |

* cited by examiner

METHOD AND DEVICE FOR CUTTING STAGGERED POCKETS

CROSS-REFERENCES TO RELATED APPLICATIONS

This application claims the benefit of U.S. Provisional Patent Application No. 63/327,495 filed Apr. 5, 2022, the entire contents of which is incorporated herein for all purposes by this reference.

BACKGROUND OF INVENTION

Field of Invention

This application relates, in general, to pocket-cutting devices and more particularly to devices configured to rout out multiple screw pockets at staggered positions, and to methods for their use.

Description of Related Art

Many cabinet and furniture products are formed from a plurality of wooden, composite, or plastic members which are joined together by various fasteners, most usually wood screws. In many instances, the members are joined together with "toe screw mortise" joinery in which wood screws are positioned in screw pockets or "mortises" formed in a first joinery member adjacent to an edge thereof, which edge is then abutted against a second joinery member and secured with the wood screws.

The formation of screw pockets can be accomplished using various methods and various types of equipment. Some efficient ways of forming screw pockets and complementary bores are set forth in my prior U.S. Pat. Nos. 11,045,970, 10,220,540, 9,403,285, 6,877,536, 5,553,645, 5,063,982, 4,944,627 and 4,603,719.

In certain applications, screw pockets are placed close to one another. For example, screw pockets may be placed within an inch or so in narrow wooden members. For example, furniture products having face frames (e.g., frameworks made up of stiles and rails) generally include members having thicknesses of ¾ inch and narrow widths of about 1½ to 2 inches. And depending upon the type of wood, the grain orientation of the wood, and/or other factors, such narrow members may be prone to cracking or splitting especially when the bores are closely situated and wood screws are positioned at a uniform depth relative to the thickness.

In light of the foregoing, it would be beneficial to have pocket-cutting devices capable of routing out staggered pockets while overcoming the above and other disadvantages of known pocket-cutting equipment.

BRIEF SUMMARY

One aspect of the present invention is directed to a pocket-cutting device for routing staggered pockets in an elongated joinery member having a longitudinal groove, the pocket-cutting device including: a base including a worktop for supporting the joinery member, and including an end stop against which an end of the joinery member abuts to longitudinally position the joinery member; a router assembly movably mounted relative to the worktop between recessed and routing positions, the router assembly including a router having a router bit for routing the pockets in the joinery member when the end abuts against the end stop and the router assembly is moved to the routing position; a clamp assembly for clamping the joinery member to the worktop, the clamp assembly including a clamp foot and a clamp actuator for moving the clamp foot relative to the worktop; and/or a guide mounted in the worktop dimensioned and configured to position the joinery member in first and second positions relative to the router assembly for routing first and second pockets in the joinery member having staggered positions relative to a bottom surface of the joinery member.

Another aspect of the present invention is directed to a pocket-cutting method for routing staggered pockets in an elongated joinery member having a longitudinal groove, the pocket-cutting method including: securing the joinery member with a guide in a first position relative to a router assembly for routing a first pocket in the joinery member; routing the first pocket in the joinery member by moving a router of the router assembly from a recessed position to a routing position; securing joinery member on the guide in a second position relative to the router assembly for routing a second pocket in the joinery member; and/or routing the second pocket in the joinery by moving the router from the recessed position to the routing position; wherein first and second pockets in the joinery member may have staggered positions relative to a bottom surface of the joinery member.

A further aspect of the present invention is directed to a joinery member including: an elongated member including top and bottom surfaces, opposing first and second edges, and an end, the elongated member further including a longitudinal groove in the bottom surface extending between the first and second edges; first and second pockets routed in the bottom surface of the elongated member, wherein the first and second pockets in the joinery member have staggered positions relative to a bottom surface of the joinery member; and/or first and second bores drilled in the end of the elongated member, each bore extending from the end to a respective one of the first and second pockets, wherein the first and second bores in the joinery member have staggered positions relative to a bottom surface of the joinery member.

Embodiments of the invention may include one or more of the following features.

The guide may include an upper surface that is substantially flush with an upper surface of the worktop, the guide may further include a recess and a longitudinal rest affixed to a bottom surface of the recess between opposing first and second sides of the recess.

The first and second sides may be parallel to one another.

The rest may have a thickness T, and wherein the first and second pockets have respective first and second apexes, the first apex having a first height H1 relative to the bottom surface and the second apex having a second height H2 relative to the bottom surface, wherein a height difference ΔH between the first and second heights is substantially equal to thickness T.

The recess may be dimensioned and configured to position the rest within the longitudinal groove when the joinery member is positioned within the recess with a first edge of the joinery member positioned against the first side of the recess, wherein a first pocket may be formed at a first location in the joinery member.

The recess may be dimensioned and configured to position the rest outside of the longitudinal groove and against a bottom surface of the joinery member when the joinery member is positioned within the recess with a second edge of the joinery member positioned against the second side of the recess.

An uppermost surface of the rest may abut against the bottom surface of the joinery member when the clamp foot may be deployed against a top surface of the joinery member, wherein a second pocket may be formed at a second location in the joinery member that is closer to the bottom surface of the joinery member than the first location.

The device may further include a drill assembly movably mounted relative to the end stop between retracted and drilling positions, the drill assembly including a drill having a drill bit for drilling bores in the joinery member when the end abuts against the end stop and the drill assembly is moved to the drilling position, each bore extending from a respective pocket to the end.

The guide may be dimensioned and configured to position the joinery member in the first and second positions relative to the drill assembly for drilling first and second bores in the joinery member that are staggered relative to a bottom surface of the joinery member.

The guide may be removably mounted in the worktop.

The guide may include a recess and a longitudinal rest affixed to a bottom surface of the recess between opposing first and second sides of the recess, and the method may further include positioning the joinery member against the first side of the recess before securing the joinery member in the first position, wherein the rest is positioned within the longitudinal groove.

The method may further include positioning the joinery member against the second side of the recess before securing the joinery member in the second position, wherein the rest may be positioned outside of the longitudinal groove.

The securing joinery member on the guide in the second position may be accomplished by deploying a clamp foot against a top surface of the joinery member to secure the joinery member against the rest such that the bottom surface of the joinery member is abutting against an uppermost surface of the rest.

The method may further include: drilling a first bore in the joinery member, while secured in the first position, by moving a drill assembly from a retracted position to a drilling position; and/or drilling a second bore in the joinery member, while secured in the second position, by moving the drill assembly from the retracted position to the drilling position; wherein each of the first and second bores may extend from a respective pocket to an end of the joinery member.

The second bore may be closer to the bottom surface of the joinery member than the first bore.

The first and second pockets may have respective first and second apexes, the first apex having a first height H1 relative to the bottom surface and the second apex having a second height H2 relative to the bottom surface.

The height difference ΔH between the first and second heights may be between approximately 3/32 inch and 3/16 inch.

The difference ΔH may be approximately the thickness of 10 gauge sheet metal.

The methods and devices of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents, and other embodiments, which may be included within the spirit and scope of the invention(s) as defined by the appended claims.

In accordance with various aspects of the present invention, the devices and methods described below are particularly well suited for partial or fully automated joinery applications such as the production of components or subassemblies used to form cabinetry or furniture. As used herein, the expression "joinery member" and "workpiece" include, but are not limited to, wooden members, composite members, plastic members, and combinations thereof. The term "screw pocket" generally refers to a depression routed into the joinery member to allow for "toe screw mortise" joinery.

In accordance with various aspects of the present invention, the devices and methods described may include various features presently found in the CSI-1.5D Pocket Cutter/Screw Inserter machine manufactured and sold by Castle, Inc. of Petaluma, California. The CSI machine facilitates high-capacity production joinery while saving time and reducing labor costs by utilizing low angle pocket cutting, Screw-in-Pocket (SIC) technology, undersized pilot holes for screw retention, screws inserted within pockets "below-flush" to prevent marring of adjacent joinery members when stacked, easy access for quick tooling changes and serviceability, and "Flip Stop" indexing systems to provide a desired gap between the screw pocket and the joinery member edge. The devices and method described may incorporate such features as well as other features, such as those disclosed in U.S. Pat. Nos. 11,045,970, 10,220,540, 9,403,285, 6,877,536, 5,553,645, 5,063,982, 4,944,627 and 4,603,719, the entire content of which is incorporated herein for all purposes by this reference.

In accordance with various aspects of the present invention, the devices and methods described are configured to form screw pockets at staggered positions relative to the thickness of a joinery member, which allows the placement of wood screws at staggered depths relative to the thickness of the joinery member. Advantageously, such configuration may reduce the likelihood of narrow joinery members from cracking or splitting, especially during assembly when the wood screws are screwed into an abutting member (e.g., when assembling a pocket-bearing rail with a stile).

Figure 1:
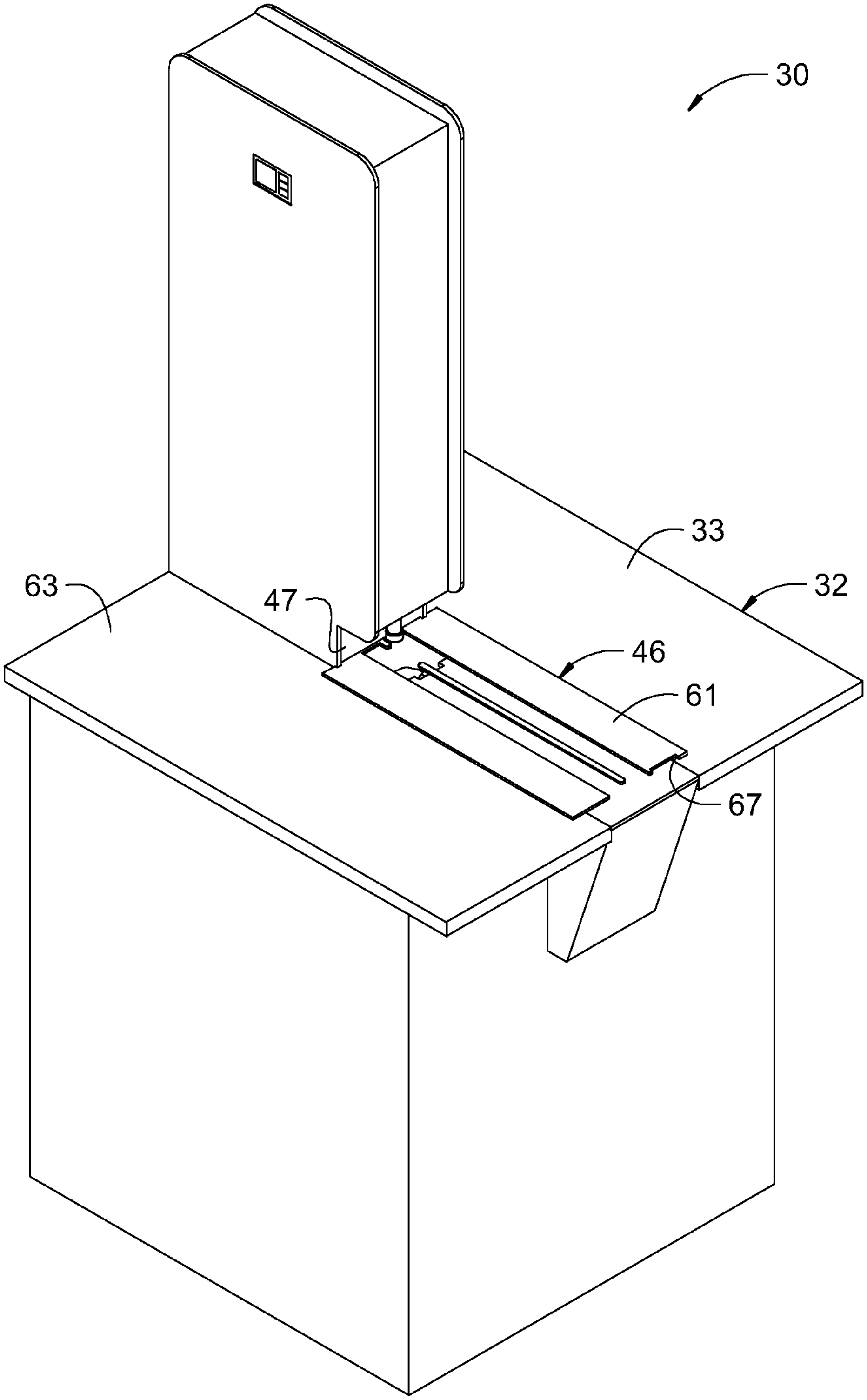
FIG. 1 is a perspective view of an exemplary device for cutting staggered pockets in accordance with various aspects of the present invention.

Turning now to the drawings, wherein like components are designated by like reference numerals throughout the various figures, attention is directed to FIG. 1 which shows an exemplary device 30 in accordance with various aspects of the present invention. The illustrated device is similar to the above-mentioned CSI machine, however, one will appreciate that various machines and tools may be provided with the components and features described below.

Figure 2:
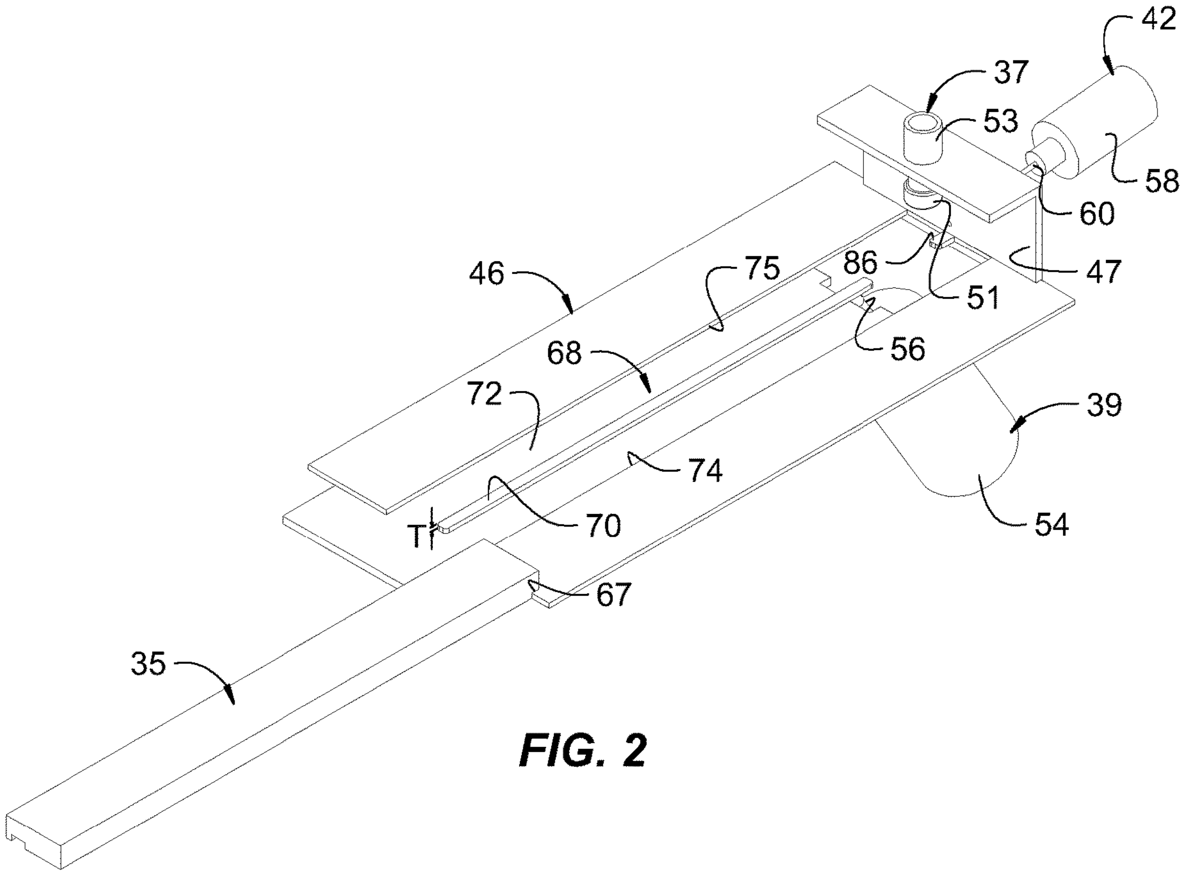
FIG. 2 is an enlarged perspective view of certain components of the device of FIG. 1, shown with a joinery member positioned against a guide to determine whether the joinery member has a width suitable for the guide.
Figure 7:
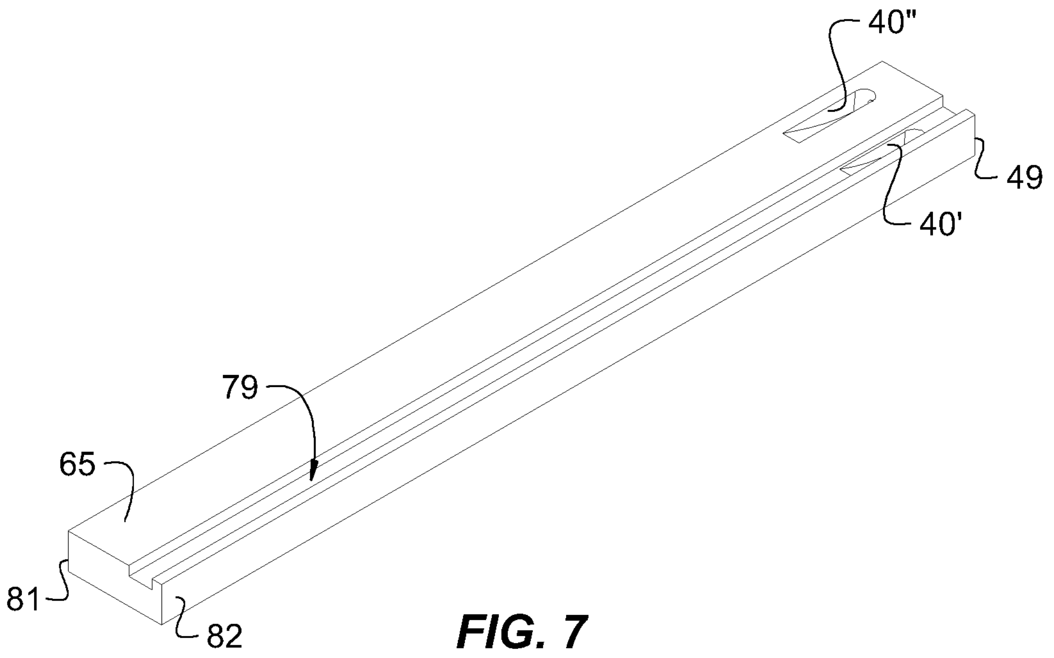
FIG. 7 is a perspective view of the joinery member with staggered pockets formed therein.

With reference to FIG. 1 and FIG. 2, device 30 generally includes a base 32 having a worktop 33 for supporting a joinery member 35. The base may also support a clamp assembly 37 for temporarily securing the joinery member to the work top, a router assembly 39 for routing a screw pocket 40 (see FIG. 7), a drill assembly 42 for drilling a screw bore 44 (see FIG. 9), and a guide 46 that is received in or on the worktop for positioning the joinery member in a plurality of positions for forming the pockets and bores in staggered positions.

Base 32 may also include an end stop 47 against which an end 49 of the joinery member abuts to longitudinally position the joinery member relative to the worktop. Once in position, the clamp assembly can be actuated for clamping the joinery member to the worktop. The clamp assembly includes a clamp foot 51 and a clamp actuator 53 for moving the clamp foot relative to the worktop.

The router assembly is movably mounted relative to the base and worktop between recessed and routing positions. The router assembly includes a router 54 having a router bit 56 for routing the pockets in the joinery member when the end abuts against the end stop and the router assembly is moved to the routing position. One will appreciate that the router bit is safely located below the worktop when the router is in its recessed position.

Figure 8:
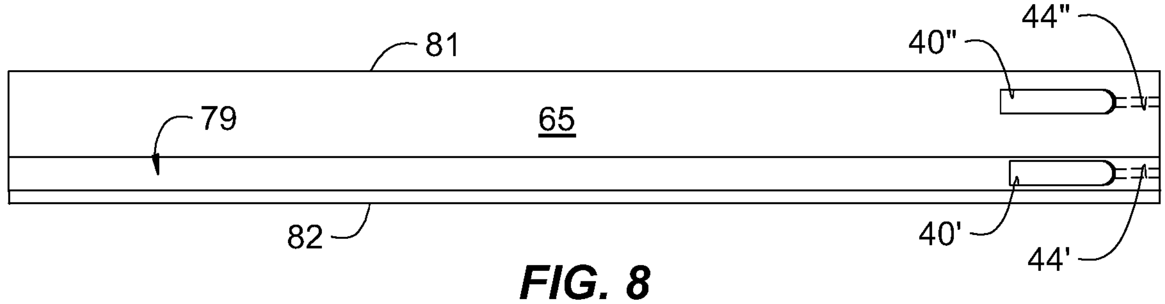
FIG. 8 is a bottom view of the joinery member shown in FIG. 7.

The drill assembly is also movably mounted relative to the base and worktop between retracted and drilling positions. The drill assembly includes a drill 58 having a drill bit 60 for drilling bores in the joinery member when the joinery member end abuts against the end stop and the drill assembly is moved to the drilling position. The resulting bore 44 extends from a respective pocket through to the end (see FIG. 8).

The guide may be removably mounted on or in the worktop such that an upper plate 61 is substantially rests upon an upper worktop surface 63. One will appreciate that the upper plate may be configured to be received by the worktop us that it is flush with the worktop. In various embodiments, the guide is a stainless steel assembly that provides a sturdy and stable work surface supporting a workpiece during routing and drilling operations. One will appreciate that the guide may be formed of other materials including, but not limited to, other metals, composites, and the like.

Figure 9:
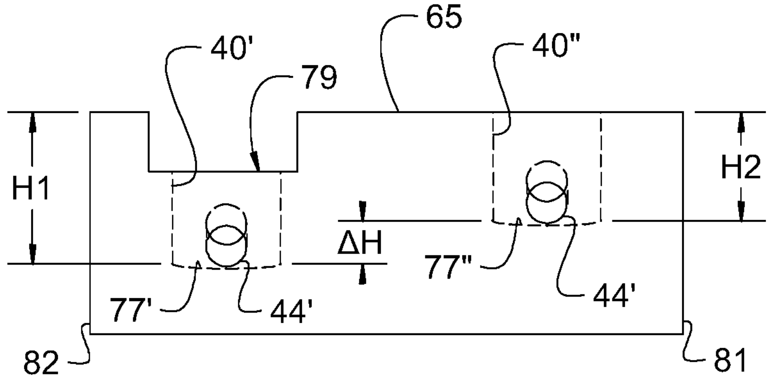
FIG. 9 is an end view of the joinery member shown in FIG. 7, showing the staggered positions of the first and second pockets.

The guide is dimensioned and configured to position the joinery member in first and second positions relative to the router and drill assemblies for routing first and second pockets in the joinery member that have staggered positions relative to a bottom member surface 65 of the joinery member (see FIG. 9). One will appreciate that multiple guides may be provided, each dimensioned and configured for use with a joinery member of a particular width, in which case the guide may include a width gauge 67 so that a user can confirm a joinery member has the proper width for use with the guide.

With reference to FIG. 2, the guide includes a recess 68 and a longitudinal rest 70 affixed to a bottom surface 72 of the recess between opposing first and second sides 74, 75 of the recess. The first and second sides may be parallel to one another for accurately positioning or indexing joinery members having parallel side edges. One will appreciate that the first and second sides may also be configured with shapes complementary to the side profiles of other types of joinery members (e.g., having converging or diverging sides, scalloped edges, etc.).

The rest has a thickness T (see FIG. 2) which corresponds to the offset distance between staggered first and second pockets 40', 40" (see FIG. 9) and first and second bores 44', 44". For example, the first and second pockets may have respective first and second apexes 77', 77", the first apex having a first height H1 relative to the bottom surface and the second apex having a second height H2 relative to the bottom surface, wherein a height difference $\Delta H$ between the first and second heights is substantially equal to thickness T.

In various embodiments, the rest may be formed of 10 gauge sheet metal to provide a suitable thickness T and corresponding $\Delta H$ to stagger pockets 40', 40" and their corresponding bores 44', 44" that reduces the likelihood of cracking or splitting. One will appreciate that the thickness may vary, and that the rest may be formed of other gauges and thicknesses, for example, 11 or 12 gauge metals. In various embodiments, the rest may be formed of metal or non-metal elongated members having thicknesses of approximately 0.123 to 0.141 inches to provide a suitable $\Delta H$ for "4/4" thick joinery members. And in various embodiments, the rest maybe of thickness to provide a $\Delta H$ between the first and second heights between approximately 3/32 inch and 3/16 inch.

Figure 4A:
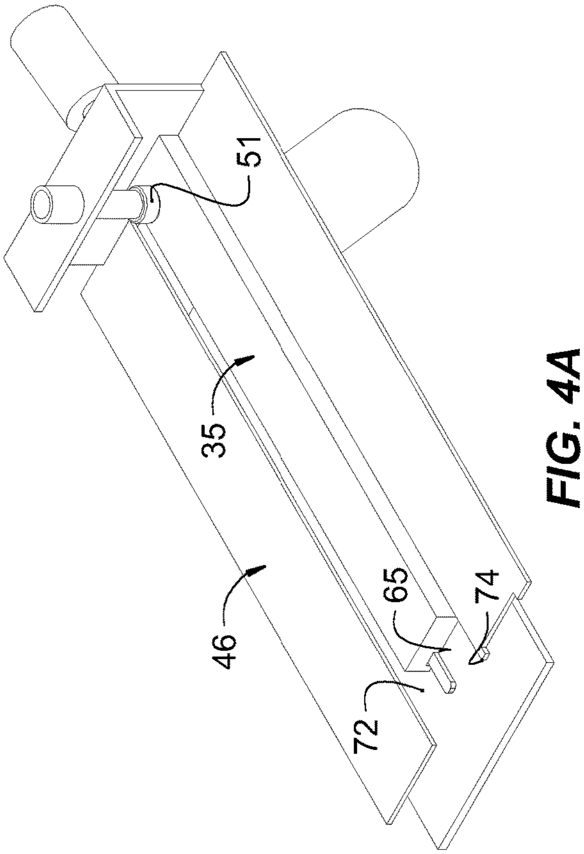
FIG. 4A is a perspective view similar to FIG. 2, shown with the joinery member clamped in the first position against the guide for cutting the first pocket.

In accordance with various aspects of the present invention, recess 68 and rest 70 are dimensioned and configured to position the rest within a longitudinal dado 79 of joinery member 35 when it is positioned within the recess with a first edge 81 of the joinery member positioned against the first side 74 of the recess, as shown in FIG. 4A, wherein the first pocket 40' may be formed at a first location in the joinery member. The rest may have a width that is approximately as wide as the dado. One will appreciate that the rest may be narrower than the dado because the abutting relationship between member first edge with recess first side indexes the side-to-side relationship between the member and the guide thus positioning the member relative to the router and drill assemblies for forming the first pocket.

One will also appreciate that the recess and rest may be dimensioned and configured to cooperate with joinery members having through dados, stopped dados (e.g., not extending the length of the workpiece), through and stopped rabbets, through and stopped grooves, though, blind, and half-blind dovetails and the like. In the case of stopped feature(s), the longitudinal dimension(s) of the rest may correspond to the longitudinal dimension(s) of the stopped feature(s).

Figure 5A:
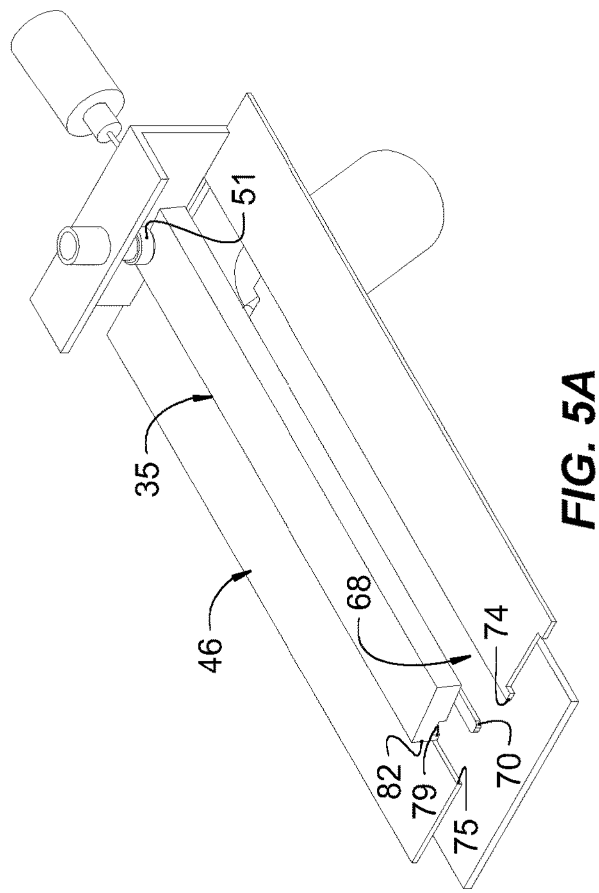
FIG. 5A is a perspective view similar to FIG. 2, shown with the joinery member positioned in a second position on the guide for cutting a second pocket.

And in accordance with various aspects of the present invention, recess 68 and rest 70 are dimensioned and configured to position the rest outside of the longitudinal dado 79 and against bottom surface 65 of joinery member 35 when the joinery member is positioned within the recess with a second edge 82 of the joinery member positioned against second side 75 of the recess, as shown in FIG. 5A.

Figure 5B:
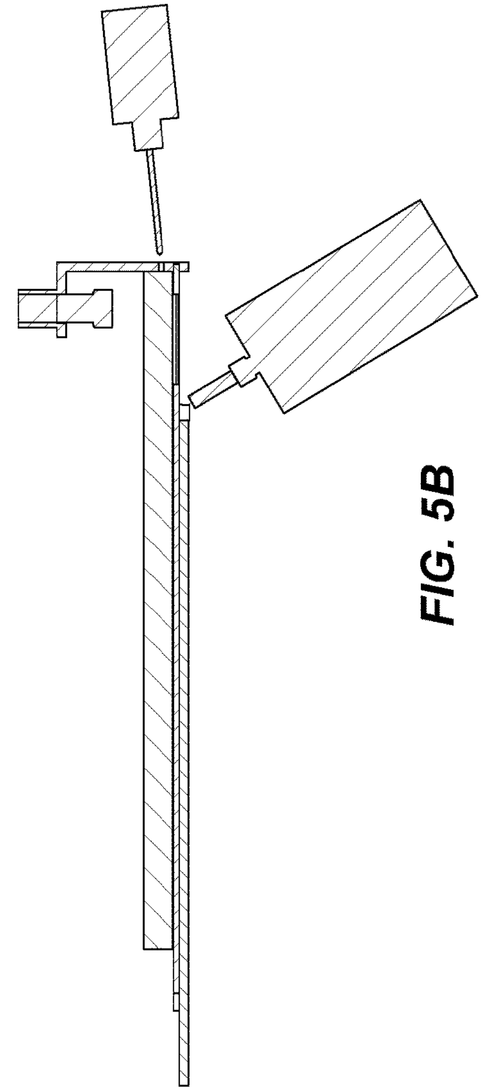
FIG. 5B is a front view of FIG. 5A.
Figure 5C:
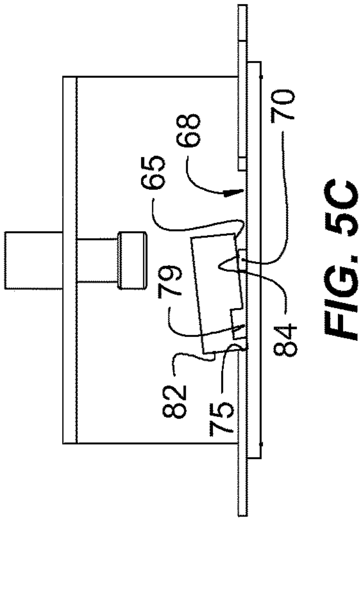
FIG. 5C is a longitudinal cross-sectional side view of FIG. 5A.

In such position, an uppermost surface 84 of the rest abuts against bottom surface 65 of the joinery member, as shown in FIG. 5C. In such position, clamp foot 51 may be deployed against a top surface of joinery member 35 to firmly secure the joinery member against rest 70, as shown in FIG. 6C. The bottom member surface abuts flatly against the uppermost rest surface thereby leveling joinery member 35 with respect to guide 46, thus properly positioning the joinery member with respect to the router and drill assemblies thus allowing the second pocket 40" be formed at a second location in the joinery member that is closer to the bottom surface of the joinery member than the first location (see e.g., 40" and H2 in FIG. 9).

In various embodiments, guide 46 may also be provided with an end rest 86 to provide support for end 49 of the joinery member during clamping. For example, as shown in FIG. 2, the end rest may be spaced from longitudinal rest 70 to provide sufficient space for the router bit 56 to rout the joinery member while providing solid support to prevent the joinery member from tilting or otherwise moving when the clamping assembly is actuated. In the illustrated embodiment, the end rest is part of the guide, however, one will appreciate that it may be provided on the worktop or other component of the pocket-cutting device so long as it provides a stable support for the joinery member end during clamping.

An exemplary method of routing staggered pockets in an elongated joinery member can now be described in accordance with various aspects of the present invention.

A "pocket cycle" generally refers to the sequence in which the machine clamps a workpiece, routes a screw pocket, drills a screw bore, and releases the workpiece. Such a "pocket cycle" may also include inserting a wood screw into the screw pocket before the workpiece is released. Most generally, the methods and devices described herein are configured for a plurality of "pocket cycles" in which a plurality of screw pockets and corresponding screw bores are formed at staggered heights in a joinery member to reduce cracking and splitting of the joinery member, especially when screwing the joinery member to another member during the assembly of cabinetry and furniture.

In operation and use, a user may ensure that a particular joinery member is of the proper width for use with a particular guide by aligning the end of joinery member 35 with width gauge 67 of guide 46, as shown in FIG. 2.

Figure 3:
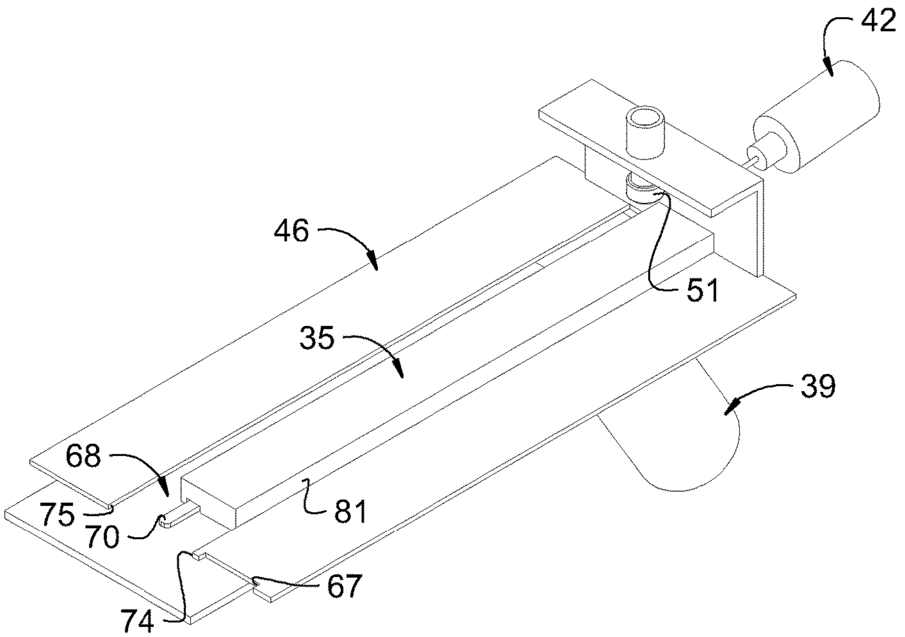
FIG. 3 is a perspective view similar to FIG. 2, shown with the joinery member positioned in a first position on the guide.

The user may then commence the first pocket cycle by positioning the joinery member on the guide in a first position by placing joinery member 35 in the recess 68 of the guide such that first edge 81 of the joinery member abuts against first side 74 of the recess, as shown in FIG. 3.

Figure 4B:
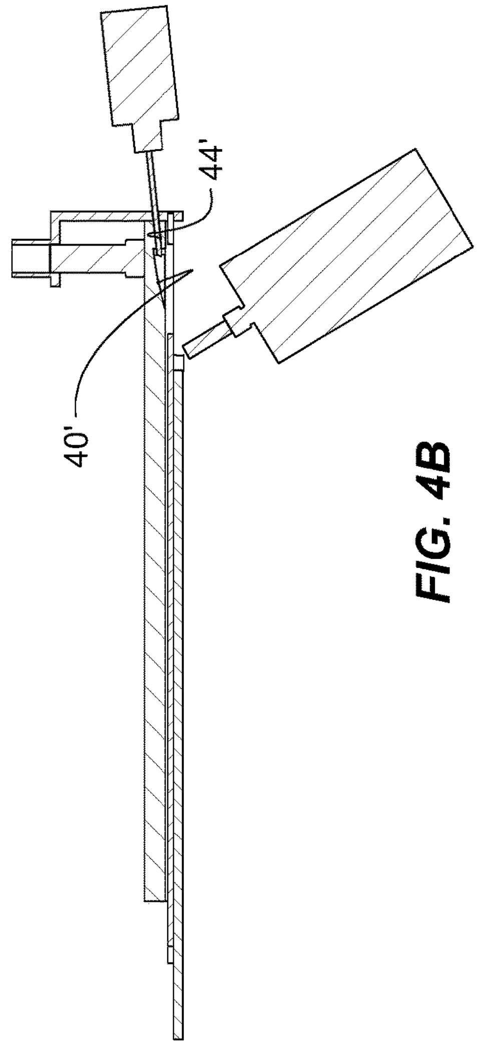
FIG. 4B is a front view of FIG. 4A.
Figure 4C:
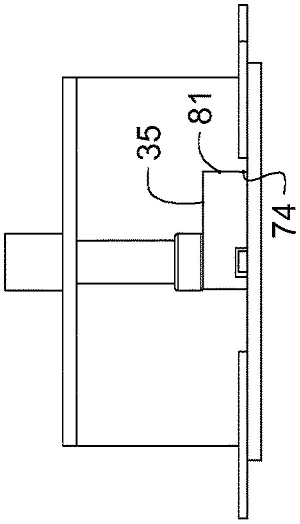
FIG. 4C is a longitudinal cross-sectional side view of FIG. 4A.

The clamp assembly may then be actuated to move clamp foot 51 against joinery member 35 to secure the joinery member against the guide 46, as shown in FIG. 4A and FIG. 4C. In particular, bottom surface 65 of the joinery member abuts against bottom surface 72 of the recess in the first position thus establishing height H1 of the first screw pocket 40' relative to the bottom surface of the joiner member.

With the joinery member firmly secured in the first position relative to the router and drill assemblies, the router may move from a recessed position to a routing position to form the first pocket 40', and the drill may move from a retracted position to a drilling position form the first bore 44' in the joinery member, as shown in FIG. 4B. Note that FIG. 4B shows the router in its recessed position and the drill in its drilling position.

The clamp assembly may then be released, and the user may move the joinery member to a second position to commence the second pocket cycle, as shown in FIG. 5A. In this position, longitudinal dado 79 is positioned away from rest 70 and thus the rest is outside of the dado, as shown in FIG. 5C. In particular, the user may position joinery member 35 on guide 46 such that second edge 82 of the joinery member abuts against second side 75 of the recess, as shown in FIG. 5C. Note that FIG. 5B shows the router in its recessed position and the drill in its retracted position.

Figure 6A:
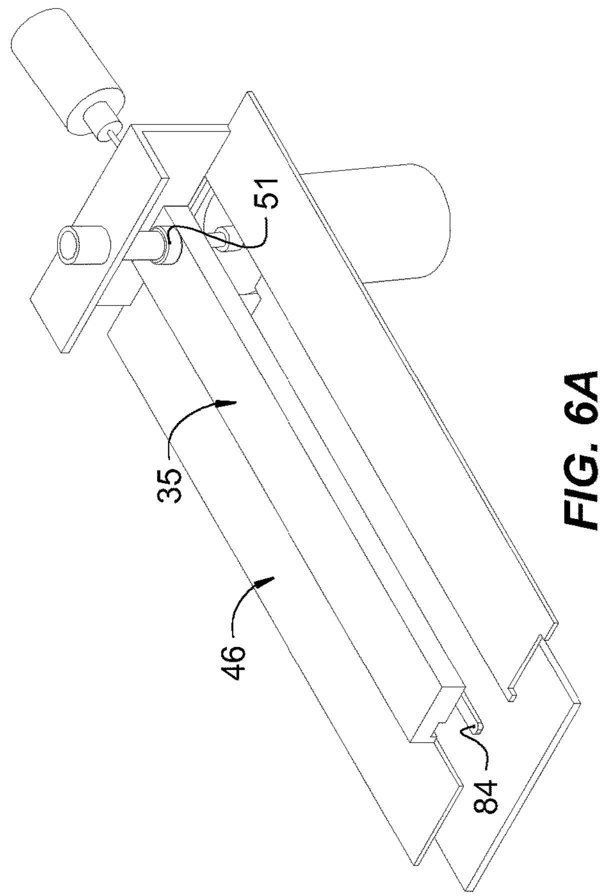
FIG. 6A is a perspective view similar to FIG. 3, shown with the joinery member clamped in the second position against the guide for cutting the second pocket.
Figure 6B:
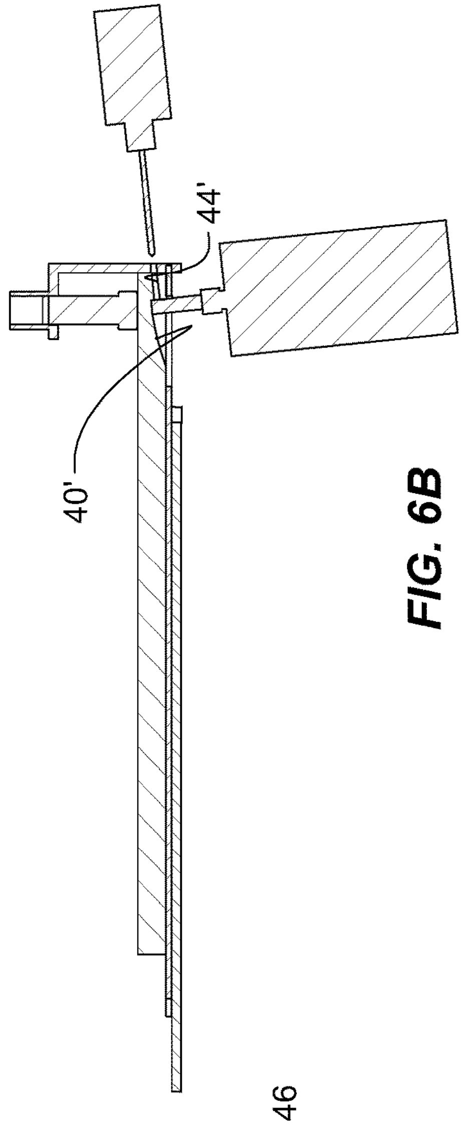
FIG. 6B is a front view of FIG. 6A.
Figure 6C:
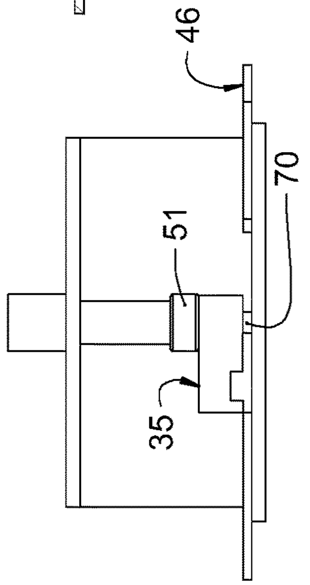
FIG. 6C is a longitudinal cross-sectional side view of FIG. 6A.

Once the joinery member is in the second position, the clamp assembly may again be actuated to move clamp foot 51 against joinery member 35 to secure the joinery member against uppermost surface 84 of the rest, as shown in FIG. 6A and FIG. 6C. With the joinery member firmly secured in a second position relative to the router and drill assemblies, the router may move from its recessed position to its routing position to form the second pocket 40", and the drill may move from the retracted position to the drilling position form the second bore 44" in the joinery member, as shown in FIG. 6B. Note that FIG. 6B shows the router in its routing position and the drill in its retracted position ready to rout and drill.

Advantageously, the configuration of the guide and the rest are particularly well suited for use with joinery members having longitudinal dadoes or other similar features. Such dadoes are common in the production of cabinetry and furniture—such dadoes readily receive panel members thus facilitating the assembly of face frames to the panels.

And advantageously, the devices and methods described herein allow for forming screw pockets and their corresponding screw bores at different levels to avoid splitting joinery members.

For convenience in explanation and accurate definition in the appended claims, the terms "upper", "outside", and etc. are used to describe features of the exemplary embodiments with reference to the positions of such features as displayed in the figures.

The foregoing descriptions of specific exemplary embodiments of the present invention(s) have been presented for purposes of illustration and description. They are not intended to be exhaustive or to limit the invention(s) to the precise forms disclosed, and obviously many modifications and variations are possible in light of the above teachings. The exemplary embodiments were chosen and described in order to explain certain principles of the invention(s) and their practical application, to thereby enable others skilled in the art to make and utilize various exemplary embodiments of the present invention(s), as well as various alternatives and modifications thereof. It is intended that the scope of the invention(s) be defined by the Claims appended hereto and their equivalents.

What is claimed is:

1. A pocket-cutting device for routing staggered first and second pockets in an elongated joinery member having a longitudinal groove, the pocket-cutting device comprising:

a base including a worktop for supporting the joinery member, and including an end stop against which an end of the joinery member abuts to longitudinally position the joinery member;

a router assembly movably mounted relative to the worktop between a recessed position and a routing position, the router assembly including a router having a router bit for routing the first and second pockets in the joinery member when the end abuts against the end stop and the router assembly is moved to the routing position;

a clamp assembly for clamping the joinery member to the worktop, the clamp assembly including a clamp foot and a clamp actuator for moving the clamp foot relative to the worktop; and a guide mounted in the worktop dimensioned and configured to position the joinery member in first and second positions relative to the router assembly for routing the first and second pockets in the joinery member having staggered positions relative to a bottom surface of the joinery member, wherein the first pocket has a first apex having a first height H1 relative to the bottom surface and the second pocket has a second apex having a second height H2 relative to the bottom surface; and wherein the guide comprises a recess and a longitudinal rest affixed to a bottom surface of the recess between opposing first and second sides of the recess, wherein the bottom surface is substantially flush with an upper surface of the worktop.

2. The pocket-cutting device according to claim 1, wherein the first and second sides are parallel to one another.

3. The pocket-cutting device according to claim 1, wherein the rest has a thickness T, and wherein a height difference ΔH between the first and second heights is substantially equal to the thickness T.

4. The pocket-cutting device according to claim 1, wherein the recess is dimensioned and configured to position the rest within the longitudinal groove when the joinery member is positioned within the recess with a first edge of the joinery member positioned against the first side of the recess, wherein the first pocket is formed at a first location in the joinery member.

5. The pocket-cutting device according to claim 4, wherein the recess is dimensioned and configured to position the rest outside of the longitudinal groove and against a bottom surface of the joinery member when the joinery member is positioned within the recess with a second edge of the joinery member positioned against the second side of the recess.

6. The pocket-cutting device according to claim 5, wherein an uppermost surface of the rest abuts against the bottom surface of the joinery member when the clamp foot is deployed against a top surface of the joinery member, wherein the second pocket may be is formed at a second location in the joinery member that is closer to the bottom surface of the joinery member than the first location.

7. The pocket-cutting device according to claim 1, the device further comprising a drill assembly movably mounted relative to the end stop between a retracted position and a drilling position, the drill assembly including a drill having a drill bit for drilling bores in the joinery member when the end abuts against the end stop and the drill assembly is moved to the drilling position, each bore extending from a respective one of said first and second pockets to the end.

8. The pocket-cutting device according to claim 7, wherein the guide is dimensioned and configured to position the joinery member in the first and second positions relative to the drill assembly for drilling first and second bores in the joinery member that are staggered relative to the bottom surface of the joinery member.

9. The pocket-cutting device according to claim 1, wherein the guide is removably mounted in the worktop.

* * * * *